US010961911B2

(12) United States Patent
Bintz et al.

(10) Patent No.: US 10,961,911 B2
(45) Date of Patent: Mar. 30, 2021

(54) INJECTION COOLED COOLING AIR SYSTEM FOR A GAS TURBINE ENGINE

(71) Applicant: United Technologies Corporation, Farmington, CT (US)

(72) Inventors: Matthew E. Bintz, West Hartford, CT (US); Dilip Prasad, North Granby, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 502 days.

(21) Appl. No.: 15/407,586

(22) Filed: Jan. 17, 2017

(65) Prior Publication Data
US 2018/0202362 A1    Jul. 19, 2018

(51) Int. Cl.
| F02C 7/18 | (2006.01) |
| F01D 25/12 | (2006.01) |
| F04D 27/02 | (2006.01) |
| F02C 6/08 | (2006.01) |
| F01D 5/08 | (2006.01) |

(52) U.S. Cl.
CPC .............. *F02C 7/185* (2013.01); *F01D 25/12* (2013.01); *F02C 6/08* (2013.01); *F02C 7/18* (2013.01); *F04D 27/0207* (2013.01); *F01D 5/081* (2013.01); *F05D 2260/205* (2013.01); *F05D 2260/207* (2013.01); *F05D 2260/212* (2013.01); *F05D 2260/232* (2013.01); *F05D 2260/601* (2013.01); *Y02T 50/60* (2013.01)

(58) Field of Classification Search
CPC .................................. F02C 7/185; F02C 7/18
See application file for complete search history.

(56) References Cited

U.S. PATENT DOCUMENTS

| 2,692,476 A | 10/1954 | Schaal et al. |
| 3,878,677 A | 4/1975 | Colvin |
| 4,254,618 A | 3/1981 | Elovic |
| 4,539,945 A | 9/1985 | Bosisio |
| 4,882,902 A | 11/1989 | Reigel et al. |
| 5,056,335 A | 10/1991 | Renninger et al. |

(Continued)

FOREIGN PATENT DOCUMENTS

| DE | 2852057 | 6/1979 |
| EP | 0447886 | 9/1991 |

(Continued)

OTHER PUBLICATIONS

The Extended European Search Report for EP Application No. 18152149.3, dated May 30, 2018.

(Continued)

*Primary Examiner* — Gerald L Sung
*Assistant Examiner* — Jacek Lisowski
(74) *Attorney, Agent, or Firm* — Carlson, Gaskey & Olds, P.C.

(57) ABSTRACT

A gas turbine engine includes an engine core having a compressor section, a combustor fluidly connected to the compressor section, and a turbine section fluidly connected to the combustor section. At least one compressor bleed connects a compressor flowpath with a first cooled cooling air path. The first cooled cooling air path includes a supplementary coolant injector connected to a supplementary coolant supply. The cooled cooling air path including a portion exterior to the engine core.

14 Claims, 4 Drawing Sheets

(56) References Cited

U.S. PATENT DOCUMENTS

| | | | |
|---|---|---|---|
| 5,269,135 A | 12/1993 | Vermejan et al. | |
| 5,305,616 A | 4/1994 | Coffinberry | |
| 5,392,614 A | 2/1995 | Coffinberry | |
| 5,414,992 A | 5/1995 | Glickstein | |
| 5,452,573 A | 9/1995 | Glickstein et al. | |
| 5,498,126 A | 3/1996 | Pighetti et al. | |
| 5,724,806 A | 3/1998 | Horner | |
| 5,758,485 A | 6/1998 | Frutschi | |
| 5,867,979 A | 2/1999 | Newton et al. | |
| 5,918,458 A | 7/1999 | Coffinberry et al. | |
| 6,050,079 A | 4/2000 | Durgin et al. | |
| 6,065,282 A | 5/2000 | Fukue et al. | |
| 6,134,880 A | 10/2000 | Yoshinaka | |
| 6,430,931 B1 | 8/2002 | Horner | |
| 6,487,863 B1 | 12/2002 | Chen et al. | |
| 6,612,114 B1 | 9/2003 | Klingels | |
| 6,615,574 B1* | 9/2003 | Marks | F02C 7/18 60/772 |
| 6,892,523 B2 | 5/2005 | Fetescu et al. | |
| 7,237,386 B2 | 7/2007 | Hoffmann et al. | |
| 7,246,484 B2 | 7/2007 | Giffin, III et al. | |
| 7,284,377 B2 | 10/2007 | Joshi et al. | |
| 7,306,424 B2 | 12/2007 | Romanov et al. | |
| 7,334,412 B2 | 2/2008 | Tiemann | |
| 7,347,637 B2 | 3/2008 | Kubo et al. | |
| 7,500,365 B2 | 3/2009 | Suciu et al. | |
| 7,552,591 B2 | 6/2009 | Bad et al. | |
| 7,698,884 B2 | 4/2010 | Maguire et al. | |
| 7,765,788 B2 | 8/2010 | Schwarz | |
| 7,823,389 B2 | 11/2010 | Seitzer et al. | |
| 7,882,691 B2 | 2/2011 | Lemmers, Jr. et al. | |
| 7,886,520 B2 | 2/2011 | Stretton et al. | |
| 8,015,828 B2 | 9/2011 | Moniz et al. | |
| 8,037,686 B2 | 10/2011 | Lasker | |
| 8,087,249 B2 | 1/2012 | Ottaviano et al. | |
| 8,181,443 B2 | 5/2012 | Rago | |
| 8,307,662 B2 | 11/2012 | Turco | |
| 8,350,398 B2 | 1/2013 | Butt | |
| 8,397,487 B2 | 3/2013 | Sennoun et al. | |
| 8,402,742 B2 | 3/2013 | Roberge et al. | |
| 8,434,997 B2 | 5/2013 | Pinero et al. | |
| 8,511,967 B2 | 8/2013 | Suciu et al. | |
| 8,522,529 B2 | 9/2013 | Martinou et al. | |
| 8,572,982 B2 | 11/2013 | Tiemann | |
| 8,602,717 B2 | 12/2013 | Suciu et al. | |
| 8,621,871 B2 | 1/2014 | McCune et al. | |
| 8,727,703 B2 | 5/2014 | Laurello et al. | |
| 8,776,952 B2 | 7/2014 | Schwarz et al. | |
| 8,814,502 B2 | 8/2014 | Eleftheriou | |
| 8,876,465 B2 | 11/2014 | Stretton | |
| 8,961,108 B2 | 2/2015 | Bergman et al. | |
| 9,234,481 B2 | 1/2016 | Suciu et al. | |
| 9,243,563 B2 | 1/2016 | Lo | |
| 9,255,492 B2 | 2/2016 | Bacic | |
| 9,260,974 B2* | 2/2016 | Hasting | F01D 11/24 |
| 9,297,391 B2 | 3/2016 | Rued et al. | |
| 9,422,063 B2 | 8/2016 | Diaz | |
| 9,429,072 B2 | 8/2016 | Diaz et al. | |
| 2003/0046938 A1* | 3/2003 | Mortzheim | F01D 17/105 60/782 |
| 2004/0088995 A1 | 5/2004 | Reissig | |
| 2005/0172612 A1 | 8/2005 | Yamanaka et al. | |
| 2007/0022735 A1 | 2/2007 | Henry et al. | |
| 2007/0213917 A1 | 9/2007 | Bruno et al. | |
| 2007/0245738 A1 | 10/2007 | Stretton et al. | |
| 2008/0028763 A1 | 2/2008 | Schwarz et al. | |
| 2008/0202092 A1* | 8/2008 | Eluripati | F01D 11/04 60/39.83 |
| 2008/0230651 A1 | 9/2008 | Porte | |
| 2008/0253881 A1 | 10/2008 | Richards | |
| 2009/0007567 A1 | 1/2009 | Porte et al. | |
| 2009/0090096 A1 | 4/2009 | Sheridan | |
| 2009/0145102 A1 | 6/2009 | Roberge et al. | |
| 2009/0196736 A1 | 8/2009 | Sengar et al. | |
| 2009/0226297 A1 | 9/2009 | Yanagi et al. | |
| 2009/0272120 A1 | 11/2009 | Tiemann | |
| 2010/0043396 A1 | 2/2010 | Coffinberry | |
| 2010/0154434 A1 | 6/2010 | Kubota et al. | |
| 2011/0036066 A1 | 2/2011 | Zhang et al. | |
| 2011/0072827 A1 | 3/2011 | Ciofini et al. | |
| 2011/0088405 A1 | 4/2011 | Turco | |
| 2011/0120083 A1 | 5/2011 | Giffin et al. | |
| 2011/0247344 A1 | 10/2011 | Glahn et al. | |
| 2012/0067055 A1 | 3/2012 | Held | |
| 2012/0102915 A1 | 5/2012 | Baltas | |
| 2012/0159961 A1 | 6/2012 | Krautheim et al. | |
| 2012/0180509 A1 | 7/2012 | DeFrancesco | |
| 2013/0036747 A1 | 2/2013 | Fuchs et al. | |
| 2013/0067928 A1 | 3/2013 | Arias Chao et al. | |
| 2013/0098059 A1 | 4/2013 | Suciu et al. | |
| 2013/0104564 A1* | 5/2013 | Arar | F01D 11/24 60/782 |
| 2013/0111916 A1* | 5/2013 | Beard | F02C 7/18 60/773 |
| 2013/0145744 A1 | 6/2013 | Lo et al. | |
| 2013/0145774 A1 | 6/2013 | Duong et al. | |
| 2013/0186102 A1 | 7/2013 | Lo | |
| 2013/0199156 A1 | 8/2013 | Ress, Jr. et al. | |
| 2013/0239583 A1 | 9/2013 | Suciu et al. | |
| 2013/0319002 A1 | 12/2013 | Sidelkovskiy et al. | |
| 2014/0020506 A1 | 1/2014 | Duong | |
| 2014/0137417 A1 | 5/2014 | Silberberg et al. | |
| 2014/0196469 A1 | 7/2014 | Finney et al. | |
| 2014/0230444 A1 | 8/2014 | Hao et al. | |
| 2014/0250898 A1 | 9/2014 | Mackin et al. | |
| 2014/0260326 A1 | 9/2014 | Schwarz et al. | |
| 2014/0311157 A1 | 10/2014 | Laurello et al. | |
| 2014/0341704 A1 | 11/2014 | Fletcher | |
| 2014/0352315 A1 | 12/2014 | Diaz | |
| 2015/0027129 A1* | 1/2015 | Franitza | F02C 7/18 60/782 |
| 2015/0107258 A1* | 4/2015 | Rofa | F02C 7/185 60/775 |
| 2015/0114611 A1 | 4/2015 | Morris et al. | |
| 2015/0285147 A1 | 10/2015 | Phillips et al. | |
| 2015/0308339 A1 | 10/2015 | Forcier | |
| 2015/0330236 A1 | 11/2015 | Beecroft et al. | |
| 2015/0354465 A1 | 12/2015 | Suciu et al. | |
| 2015/0354822 A1 | 12/2015 | Suciu et al. | |
| 2016/0010554 A1 | 1/2016 | Suciu et al. | |
| 2016/0131036 A1 | 5/2016 | Bintz et al. | |
| 2016/0131037 A1 | 5/2016 | Spangler et al. | |
| 2016/0169118 A1 | 6/2016 | Duong | |
| 2016/0215732 A1 | 7/2016 | Malecki | |
| 2016/0237906 A1 | 8/2016 | Suciu et al. | |
| 2016/0312797 A1 | 10/2016 | Suciu et al. | |
| 2016/0341125 A1 | 11/2016 | Kraft et al. | |
| 2016/0369697 A1 | 12/2016 | Schwarz et al. | |
| 2017/0009657 A1 | 1/2017 | Schwarz et al. | |
| 2017/0044980 A1 | 2/2017 | Duesler et al. | |
| 2017/0044982 A1 | 2/2017 | Duesler et al. | |
| 2017/0152765 A1 | 6/2017 | Uechi et al. | |
| 2017/0159568 A1 | 6/2017 | Sennoun et al. | |
| 2017/0167388 A1 | 6/2017 | Merry et al. | |
| 2017/0175632 A1 | 6/2017 | Hanrahan et al. | |
| 2017/0184027 A1 | 6/2017 | Moniz et al. | |
| 2017/0204787 A1 | 7/2017 | Duesler et al. | |

FOREIGN PATENT DOCUMENTS

| | | |
|---|---|---|
| EP | 0469825 | 2/1992 |
| EP | 0608142 | 7/1994 |
| EP | 0903484 | 3/1999 |
| EP | 1314872 | 5/2003 |
| EP | 1944475 | 7/2008 |
| EP | 2085599 | 8/2009 |
| EP | 2128023 | 12/2009 |
| EP | 2362081 | 8/2011 |
| EP | 2540991 | 1/2013 |
| EP | 2584172 | 4/2013 |
| EP | 2604825 | 6/2013 |
| EP | 2733322 | 5/2014 |
| EP | 2865981 | 4/2015 |

(56) References Cited

FOREIGN PATENT DOCUMENTS

| | | |
|---|---|---|
| EP | 2942490 | 11/2015 |
| EP | 3085923 | 10/2016 |
| EP | 3085924 | 10/2016 |
| EP | 3121411 | 1/2017 |
| FR | 2851295 | 8/2004 |
| GB | 1244340 | 8/1971 |
| GB | 2152148 | 7/1985 |
| JP | H1136889 | 2/1999 |
| WO | 2003037715 | 5/2003 |
| WO | 2008082335 | 7/2008 |
| WO | 2013154631 | 10/2013 |
| WO | 2014033220 | 3/2014 |
| WO | 2014046713 | 3/2014 |
| WO | 2014092777 | 6/2014 |
| WO | 2014120125 | 8/2014 |

OTHER PUBLICATIONS

Dornheim, Michael A., Rolls-Royce Trent 1000 to Drive Boeing 787 Accessories From IP Spool, Aviation Week & Space Technology, Mar. 28, 2005, p. 51, Los Angeles, CA.
U.S. Appl. No. 15/232,101.
U.S. Appl. No. 14/964,984.
U.S. Appl. No. 14/967,446.
U.S. Appl. No. 15/069,197.
U.S. Appl. No. 15/269,014.
U.S. Appl. No. 15/373,072.
European Search Report for European Application No. 16166707.6 dated Sep. 26, 2016.
European Search Report for European Application No. 16166724.1 dated Sep. 26, 2016.
European Search Report for European Patent Application No. 16154635.3 dated Jul. 6, 2016.
European Search Report for European Application No. 16155316.9 completed Jun. 30, 2016.
European Search Report for Application No. 16170021.6 dated Oct. 11, 2016.
European Search Report for Application No. 16174862.9 dated Nov. 7, 2016.
European Search Report for European Application No. 16175531.9 dated Nov. 15, 2016.
European Search Report for European Application No. 16175533.5 dated Nov. 15, 2016.
European Search Report for European Application No. 16175552.5 dated Nov. 17, 2016.
European Search Report for European Application No. 16175760.4 dated Nov. 16, 2016.
European Search Report for Application No. 16178207.3 dated Nov. 21, 2016.
European Search Report for European Application No. 16202876.5 dated Apr. 24, 2017.
European Search Report for European Application No. 16180657.5 dated Dec. 16, 2016.
European Search Report for EP Application No. 17160816.9 dated Jul. 21, 2017.

\* cited by examiner

INJECTION COOLED COOLING AIR SYSTEM FOR A GAS TURBINE ENGINE

TECHNICAL FIELD

The present disclosure relates generally to a cooled cooling air system for a gas turbine engine, and more specifically to an injection cooling system for the same.

BACKGROUND

Gas turbine engines include a compressor section that compresses air, a combustor that mixes the compressed air with a fuel and ignites the mixture, and a turbine section across which the resultant combustion products are expanded. As a result of the compression, combustion, and expansion process, areas of the gas turbine engine, including portions of the flowpath such as the combustor, the high pressure turbine, and the high pressure compressor are exposed to extreme temperatures. In order to mitigate the extreme temperatures, components exposed to the flowpath are, in some examples, actively cooled by providing a coolant to the component.

In such examples, the coolant can be extracted from sources within the gas turbine engine, such as the compressor outlet, or a mid-stage of the compressor via a compressor bleed. For certain engine cycles, depending on the position within the primary flowpath that the coolant is bled from, the temperature of the coolant can be too high to effectively cool the component that the coolant is being directed to. To remedy this, the coolant is actively cooled, and the system is referred to as a cooled coolant system.

In a typical example cooled coolant system, the coolant is passed through a physical heat exchanger, where the coolant is cooled via conventional heat exchange. Heat exchangers of this type are large and can incur substantial monetary costs, weight increases and performance losses on the gas turbine engine. Further exacerbating these losses is the fact that the cooling demand is not fixed throughout the flight cycle, and during portions of the flight the additional cooling is not actively needed.

SUMMARY OF THE INVENTION

In one exemplary embodiment a gas turbine engine includes an engine core having a compressor section, a combustor fluidly connected to the compressor section, and a turbine section fluidly connected to the combustor section, at least one compressor bleed connecting a compressor flowpath with a first cooled cooling air path, the first cooled cooling air path including a supplementary coolant injector connected to a supplementary coolant supply, the cooled cooling air path including a portion exterior to the engine core.

In another exemplary embodiment of the above described gas turbine engine the supplementary coolant injector is exterior to the engine core.

In another exemplary embodiment of any of the above described gas turbine engines the at least one compressor bleed is disposed at a compressor outlet.

In another exemplary embodiment of any of the above described gas turbine engines at least a first compressor bleed of the at least one compressor bleed is disposed at a mid-compressor stage.

In another exemplary embodiment of any of the above described gas turbine engines at least a second compressor bleed of the at least one compressor bleed is disposed at a compressor outlet.

In another exemplary embodiment of any of the above described gas turbine engines the supplementary coolant is configured to cool coolant in the cooled cooling air path at least partially via expansion of the supplementary coolant.

In another exemplary embodiment of any of the above described gas turbine engines the supplementary coolant injector comprises a plurality of supplementary coolant ports, each of the supplementary coolant ports being configured to inject a portion of the supplementary coolant into the cooled cooling air path.

In another exemplary embodiment of any of the above described gas turbine engines the at least one compressor bleed comprises at least a first compressor bleed connected to the cooled cooling air path and a second compressor bleed connected to a second cooled cooling air path, and wherein a supplementary coolant connected to the first cooled cooling air path is a liquid, and a supplementary coolant connected to the second cooled cooling air path is a compressed gas.

In another exemplary embodiment of any of the above described gas turbine engines the supplementary coolant is configured to cool coolant in the cooled cooling air path at least partially via a state change of the supplementary coolant.

Another exemplary embodiment of any of the above described gas turbine engines further includes an engine controller controllably coupled to the supplementary coolant injector and configured to control injection of the supplementary coolant through the supplementary coolant injector.

In another exemplary embodiment of any of the above described gas turbine engines the controller includes a memory storing instructions configured to cause the controller to operate the injector at a first injection level during a first engine mode of operations, and at a second injection level during a second mode of engine operations.

In another exemplary embodiment of any of the above described gas turbine engines the cooled cooling air path includes a heat exchanger configured to cool bleed air passing through the cooled cooling air path.

In another exemplary embodiment of any of the above described gas turbine engines a supplementary coolant contained in the coolant supply comprises at least one of a compressed gas, water, liquid nitrogen, liquid $CO_2$, and liquid air.

An exemplary method for cooling air in a cooled cooling air system includes injecting at least a first supplementary coolant into a first cooled cooling air path, and thereby cooling a coolant passing through the cooled cooling air path, the supplementary coolant including a compressed gas and providing the cooled cooling air to at least one flowpath component of a gas turbine engine.

In another example of the above described exemplary method for cooling air in a cooled cooling air system injecting at least the first supplementary coolant into the first cooled cooling air path, further comprises injecting a second supplementary coolant into a second cooled cooling air path.

In another example of any of the above described exemplary methods for cooling air in a cooled cooling air system the first supplementary coolant includes a compressed gas, and the second supplementary coolant is one of a compressed gas distinct from the first compressed gas and a liquid.

Another example of any of the above described exemplary methods for cooling air in a cooled cooling air system further includes receiving coolant into the first cooled cooling air path from at least one compressor bleed.

In another example of any of the above described exemplary methods for cooling air in a cooled cooling air system the compressor bleed is one of a mid stage compressor bleed and a compressor outlet bleed.

Another example of any of the above described exemplary methods for cooling air in a cooled cooling air system further includes cooling air in the first coolant path using a heat exchanger.

Another example of any of the above described exemplary methods for cooling air in a cooled cooling air system further includes varying an amount of the first supplementary coolant injected into the first cooled cooling air path using a controller, with the amount of coolant injected being dependent upon a current engine mode of operations.

These and other features of the present invention can be best understood from the following specification and drawings, the following of which is a brief description.

DETAILED DESCRIPTION OF AN EMBODIMENT

Figure 1:
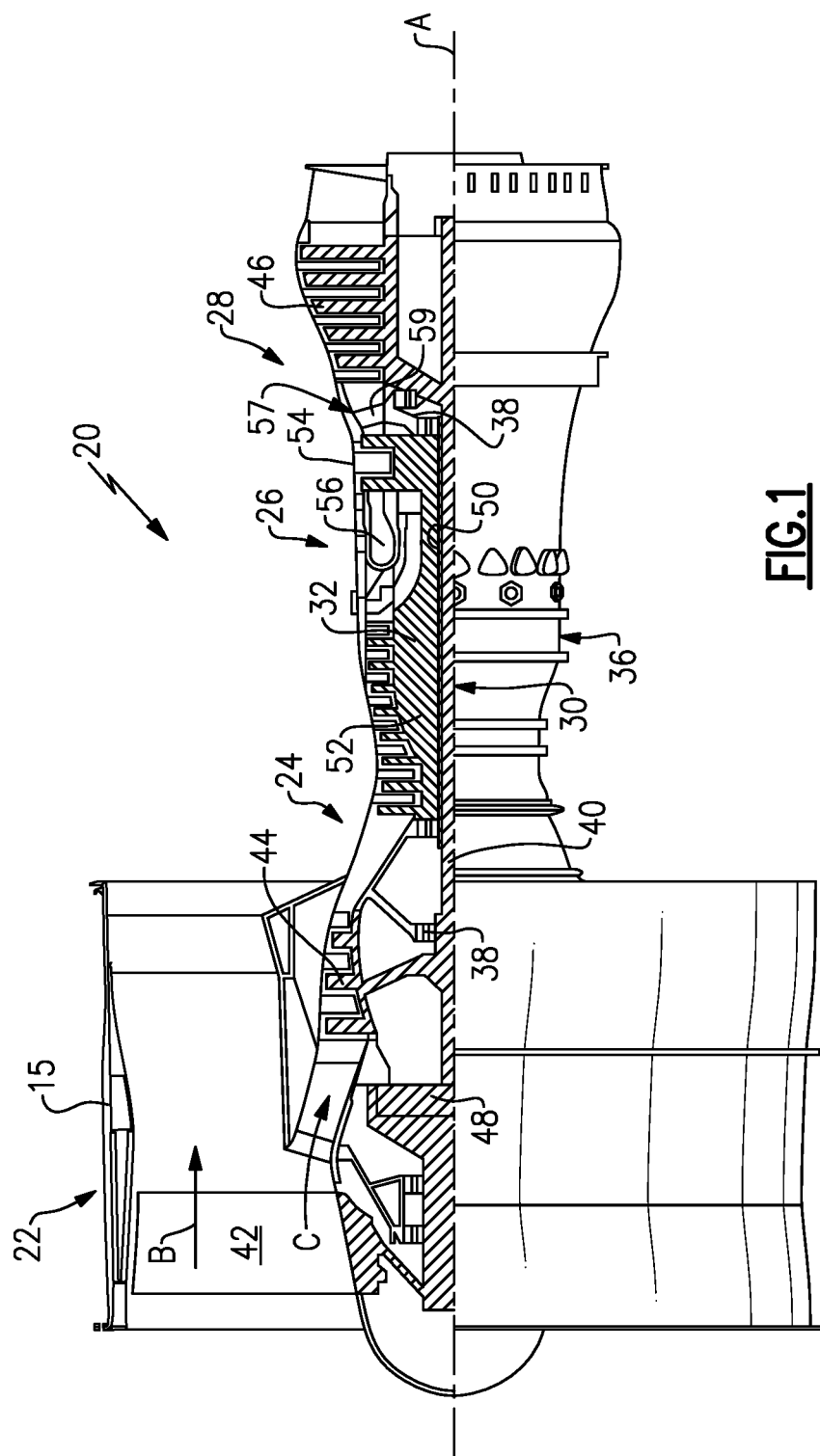
FIG. 1 illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded across the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10668 meters). The flight condition of 0.8 Mach and 35,000 ft (10668 m), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram}° \text{R})/(518.7° \text{R})]^{0.5}$. The "Low corrected fan tip speed" as disclosed herein according to one non-limiting embodiment is less than about 1150 ft/second (350.5 m/s).

Combustion within combustor section 26, and expansion across the turbine section 28, generates extreme levels of heat, and exposes components at or near the combustor section 26 and turbine section 28, and in contact with the flowpath, to the high levels of heat. In alternative examples, any component within the turbine engine core can be exposed to the high levels of heat. As used herein, the turbine engine core refers to the compressor section 24, combustor section 26 and the turbine section 28, as well as the inner and outer radial structures that define the compressor section 24, combustor section 26 and turbine section 28. Turbine engine components exposed to the primary flowpath are referred to herein as "flowpath components". In some examples, the magnitude of heat to which the flowpath components are exposed is in excess of the heat capabilities of the flowpath component. In such examples, the flowpath components are actively cooled, in order to maintain the temperature of the flowpath component below a maximum temperature to which the component can be exposed without suffering damage. One way of sourcing the coolant for the flowpath components is to remove (bleed) air from within the compressor section 24, either at a mid-compressor bleed or at a compressor outlet, and duct the bleed air to a cooling circuit of the flowpath component being cooled.

Figure 2:
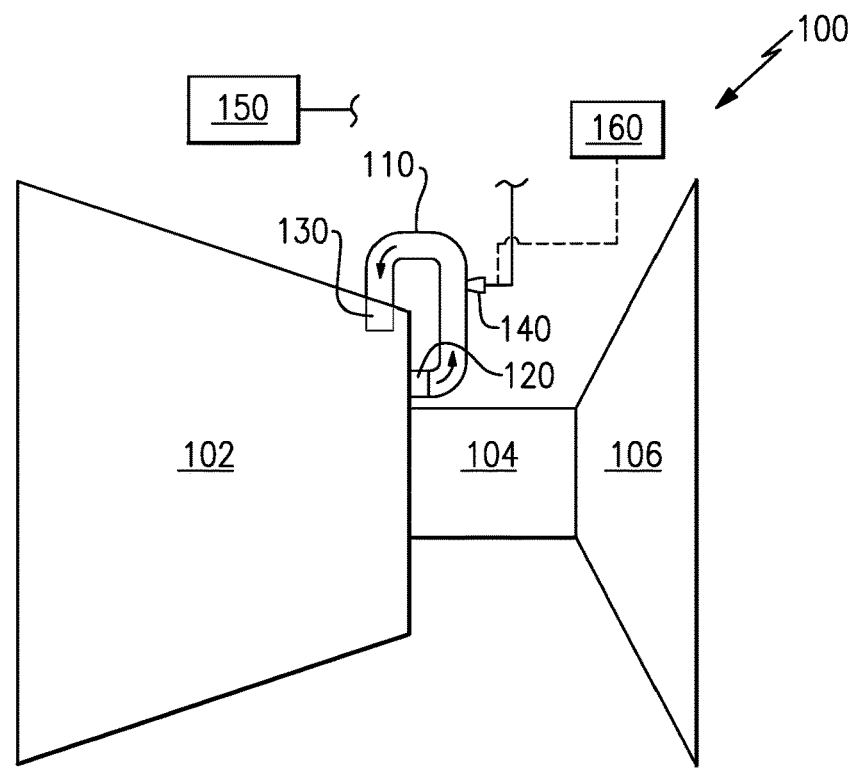
FIG. 2 schematically illustrates a portion of the gas turbine engine including a first exemplary cooled cooling air system.

With continued reference to FIG. 1, FIG. 2 schematically illustrates a portion 100 of a gas turbine engine including a first exemplary cooled cooling air system 110. The illustrated portion 100 of the gas turbine engine includes a compressor section 102, a combustor section 104 and a turbine section 106. A compressor bleed 120 is included at an outlet of the compressor section 102 and provides a portion of the compressed air output from the compressor section 102 to the cooled cooling air system 110. The cooled cooling air system 110 ducts the bleed air to an input port 130 of a cooling circuit of a flowpath component at, or near, a last stage of the compressor section 102. In alternative examples, the cooled cooling air can be provided to a flowpath component at any other position within the compressor section 102.

The cooled cooling air system 110 further includes a supplementary coolant injector 140. The supplementary coolant injector 140 is configured to inject a supplementary coolant, such as a liquid or a compressed gas, into the cooled cooling air system 110. Injection of the supplementary coolant reduces the temperature of the bleed air, allowing the bleed air to be utilized to cool a flowpath component. In some examples, such as the liquid supplementary coolant examples, the supplementary coolant operates to cool the bleed air at least in part via a phase change, where the liquid coolant is converted into a gas. In other examples, such as a compressed gas supplementary coolant example, the expansion of the supplemental coolant can contribute to, and enhance, the cooling within the cooled cooling air system 110.

The supplementary coolant is provided to the injector 140 from a supplementary coolant source 150. The supplementary coolant source 150 is disposed within the engine housing. In the case of a liquid supplementary coolant, the supplementary coolant source 150 can be a liquid reservoir. In the case of a compressed gas supplementary coolant, the supplementary coolant source can be a pre-charged canister, a supplementary compressor, a gas generator, or any similar construction. The injector 140 is connected to the supplementary coolant source 150 via any known connection suitable for the fluid type of the supplementary coolant.

In some examples, the cooled cooling air is sufficient to cool the receiving flowpath component, without requiring supplementary coolant injection in some modes of engine operation, but requires supplementary coolant injection in other modes of engine operation. In such an example, a controller 160 can control the injector 140 using any known injection control, such that supplementary coolant is provided to the cooled cooling air system 110 only during modes of engine operation where the supplementary coolant is required. Further, in some examples, the amount of supplementary coolant required can vary depending on the mode of operation in which the engine is operating. In such examples, the controller 160 can vary the volume of supplementary coolant provided to the cooled cooling air path and/or vary the frequency with which the supplementary coolant is provided to the cooled cooling air system 110.

Figure 3:
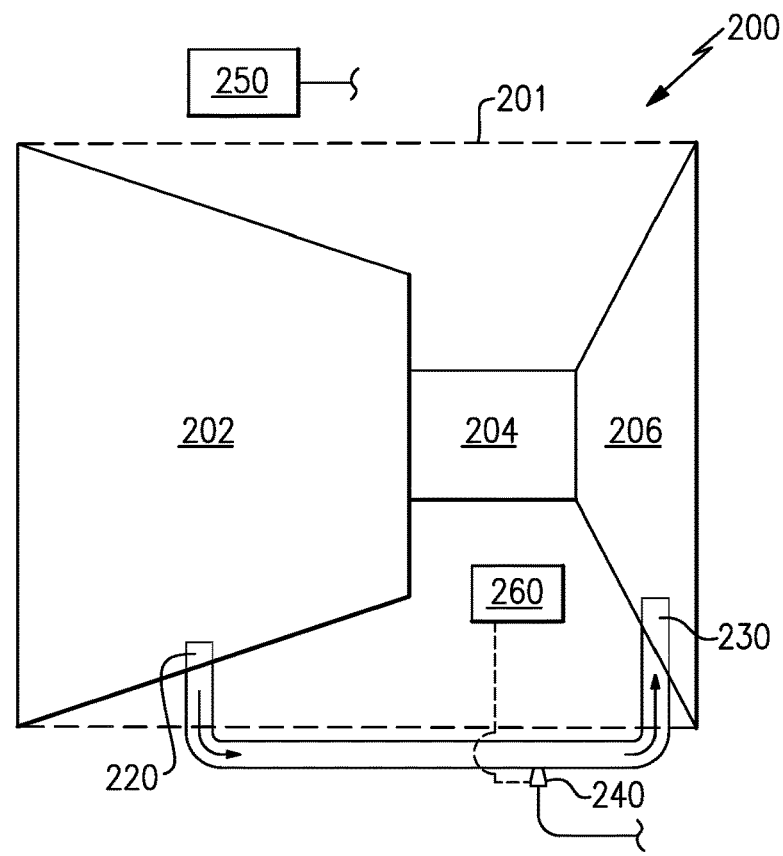
FIG. 3 schematically illustrates a portion of the gas turbine engine including a second exemplary cooled cooling air system.

With continued reference to FIG. 2, and with like numerals indicating like elements, FIG. 3 illustrates another exemplary portion 200 of a gas turbine engine including a first exemplary cooled cooling air system 210. The illustrated portion 200 of the gas turbine engine includes a compressor section 202, a combustor section 204 and a turbine section 206 defined within an engine core 201. A compressor bleed 220 is included at a mid-stage of the compressor section 202. The compressor bleed 220 removes a portion of the compressed air at the corresponding stage of the compressor section 202 and provides the removed (bleed) air to the cooled cooling air system 210. The cooled cooling air system 210 includes a portion that extends outside of the engine core 201. The cooled cooling air system 210 ducts the bleed air to an input port 230 of a cooling circuit of a flowpath component at, or near, a mid-stage of the turbine section 206. In alternative examples, the cooled cooling air can be provided to a flowpath component at any other position within the turbine section 206, including flowpath components at the first stage or multiple flowpath components disposed at multiple stages of the turbine section 206.

As with the example of FIG. 1, in some or all modes of engine operation, the temperature of the coolant provided from the bleed 220 is too high to sufficiently cool the flowpath components receiving the cooled cooling air from the cooled cooling air system 210. In such a case, a supplementary coolant is injected into the cooled cooling air system 210 via a supplementary coolant injector 240. In the illustrated example, the supplementary coolant injector 240 is positioned exterior to the engine core 201. The supplementary coolant is stored and/or generated, depending on the type of supplementary coolant used, in a supplementary coolant reservoir 250. The supplementary coolant reservoir 250 provides the supplementary coolant to the injector 240 via any suitable supplementary coolant transmission means.

Further, as with the example of FIG. 2, a controller 260 can be controllably coupled to the injector 240, thereby allowing the supplementary coolant to be provided only during engine modes of operation where the supplementary coolant is needed, and allowing the injector 240 to vary the amount of supplementary coolant provided during different modes of engine operation in which some supplementary coolant is needed.

Figure 4:
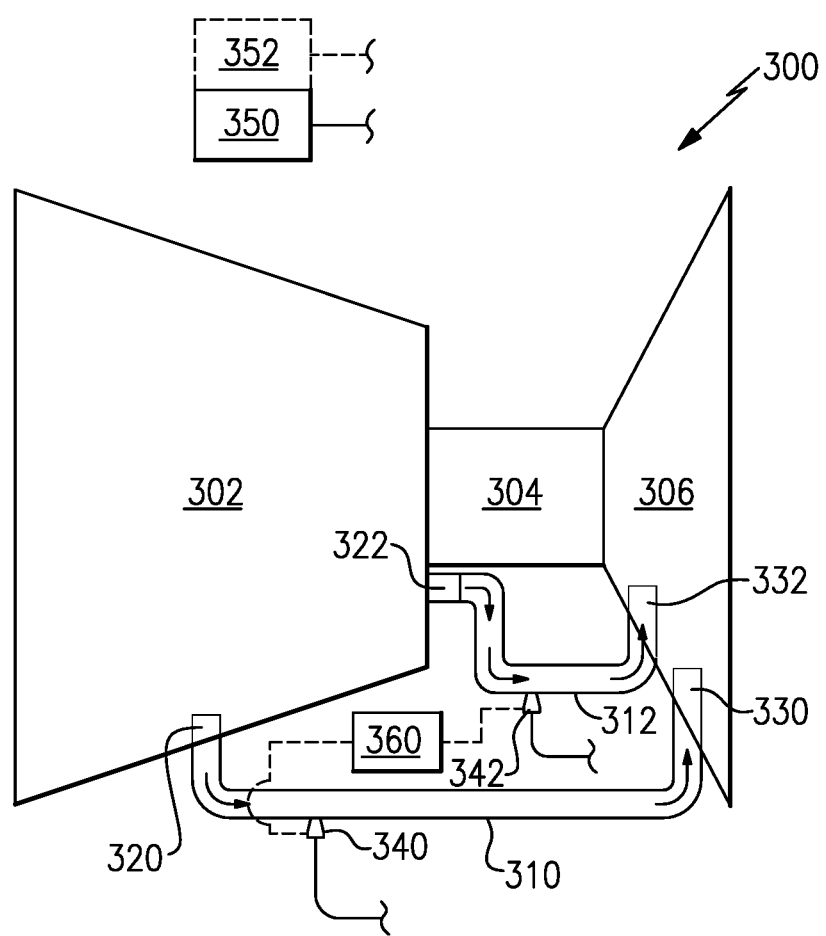
FIG. 4 schematically illustrates a portion of the gas turbine engine including a third exemplary cooled cooling air system.
Figure 5:
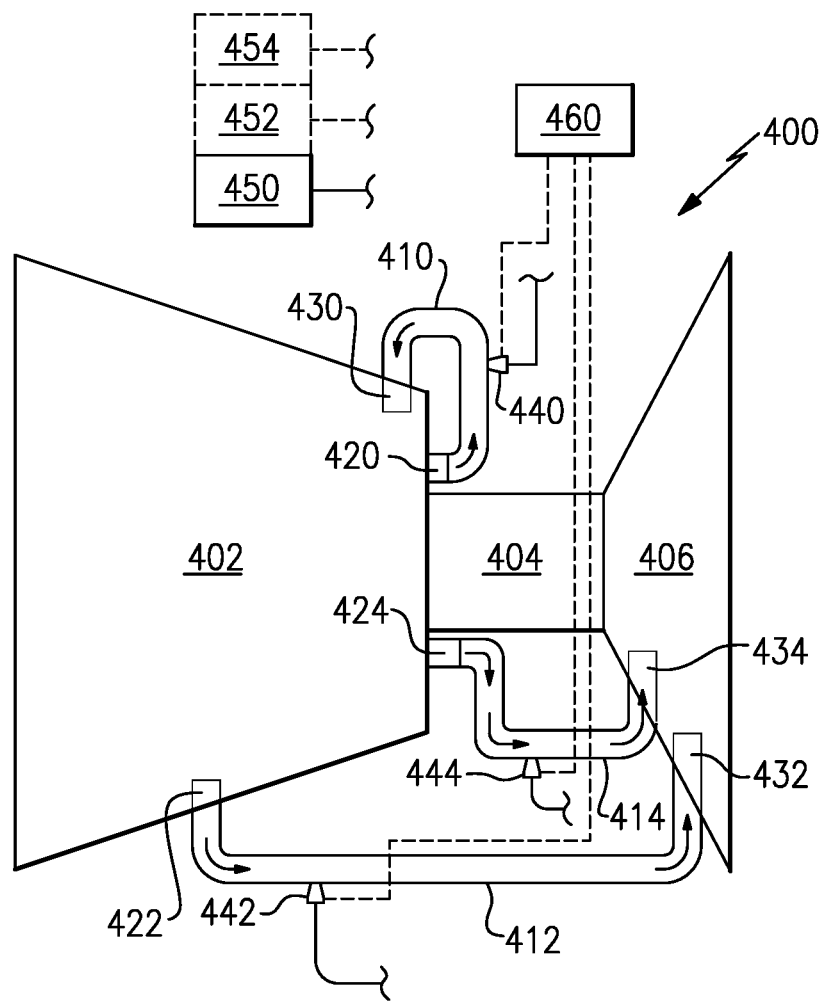
FIG. 5 schematically illustrates a portion of the gas turbine engine including a fourth exemplary cooled cooling air system.

With continued reference to FIGS. 2 and 3, and with like numerals indicating like elements, FIG. 4 schematically illustrates another exemplary portion 300 of a gas turbine engine including a first exemplary cooled cooling air system 310 and a second cooled cooling air system 312. The illustrated portion 300 of the gas turbine engine includes a compressor section 302, a combustor section 304 and a turbine section 306. A first compressor bleed 320 is included at a mid-stage of the compressor section 302. The first compressor bleed 320 removes a portion of the compressed air at the corresponding stage of the compressor section 302 and provides the removed (bleed) air to the first cooled cooling air system 310. The first cooled cooling air system 310 ducts the bleed air to an input port 330 of a cooling circuit of a flowpath component at, or near, a mid-stage of the turbine section 306.

A second compressor bleed 322 is provided at an outlet of the compressor section 302. The second compressor bleed removes (bleeds) a portion of the compressed air output from the compressor section 302, and provides the bleed air to the second cooled cooling air system 312. The second cooled cooling air system 312 provides the bleed air to an input port 332 at a first stage of the turbine section 306.

In alternative examples, the cooled cooling air in either cooled cooling air system 310, 312 can be provided to flowpath components at any other positions within the turbine section 206, including to multiple flowpath components disposed at multiple stages of the turbine section 206.

As with the previous examples, in some or all modes of engine operation, the temperature of the coolant provided from the bleeds 320, 322 is too high to sufficiently cool the flowpath components receiving the cooled cooling air from the corresponding cooled cooling air systems 310, 312. In such a case, a supplementary coolant is injected into the cooled cooling air systems 310, 312 via supplementary coolant injectors 340, 342. The supplementary coolant is stored and/or generated, depending on the type of supplementary coolant used, in a supplementary coolant reservoir 350. The supplementary coolant reservoir 350 provides the supplementary coolant to the injectors 340, 342 via any suitable supplementary coolant transmission means. In some alternative examples, the first and second cooled cooling air systems 310, 312 can utilize distinct supplementary coolant types. In such an example, a second supplementary coolant source 352 can also be included and provides the second type of supplementary coolant in the same manner as the first supplementary coolant reservoir 350.

Further, as with the previous examples, a controller 360 can be controllably coupled to the injectors 340, 342, thereby allowing the supplementary coolant to be provided only during engine modes of operation where the supplementary coolant is needed, and allowing the injectors 340, 342 to vary the amount of supplementary coolant provided during different modes of engine operation in which some supplementary coolant is needed. Further, each of the injectors 340, 342 is independently controlled, allowing supplementary coolant to be provided to one, both, or neither of the cooled cooling air systems at any given time, depending on the particular mode of engine operations.

With continued reference to FIGS. 2-4, FIG. 5 schematically illustrates a combination of the example of FIG. 2 and the example of FIG. 4. The exemplary portion 400 of the gas turbine engine includes a compressor section 402, a combustor section 404, and a turbine section 406. The exemplary schematic includes a first, second and third, cooled cooling air system 410, 412, 414. Each cooled cooling air system is connected to a compressor bleed, 420, 422, 424, and provides cooling air to a corresponding flowpath component via input ports 430, 432, 434. Supplementary coolant injectors 440, 442, 444 are included in each of the cooled coolant systems 410, 412, 414, and provide supplementary coolant from at least one of the supplementary coolant reservoirs 450, 452, 454 in quantities depending on the specific mode of engine operations. As with the previous examples, each of the injectors 440, 442, 444 can be independently controller via an engine controller 460.

While illustrated in each of the above examples as providing supplementary coolant to the corresponding cooled cooling air system at a single schematic injection point, one of skill in the art will understand that the injectors can include multiple ports, and injection holes for providing the supplementary coolant to the corresponding cooled cooling air system. Further, the position of the injector 140, relative to the flow through the cooled cooling air system is not limited to the illustrated exemplary positions. The injectors can be positioned immediately adjacent the bleed, immediately adjacent the cooled cooling air system outlet, or at any position between the two, depending on the structural requirements of the engine, and the specific cooling needs of any given engine system.

In further examples, one or more included cooled cooling system can include a physical heat exchanger that provides a set amount of cooling to the cooled cooling air under all operating conditions, and supplemental coolant can be injected to the cooled cooling air upstream, or downstream, of the physical heat exchanger according to the above description.

While illustrated in FIGS. 2 and 4 as interior to the engine core, one of skill in the art will understand that as with FIG. 3, some or all of the cooled cooling air circuit ducting can pass exterior to the engine core, and in such examples the supplementary coolant injector can be included exterior to the engine core as well.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
an engine core having a compressor section, a combustor section fluidly connected to the compressor section, and a turbine section fluidly connected to the combustor section;
at least one compressor bleed connecting a compressor flowpath with a first cooled cooling air path, the at least one compressor bleed including a first compressor bleed disposed at a compressor outlet;
the first cooled cooling air path including a supplementary coolant injector connected to a supplementary coolant supply and configured to inject a supplementary coolant into the first cooled cooling air path, the first cooled cooling air path including a portion exterior to the engine core,
wherein the first cooled cooling air path ducts bleed air to an input port at, or near, a last stage of the compressor section; and
the supplementary coolant contained in said supplementary coolant supply comprises at least one of liquid nitrogen, liquid CO2 and liquid air.

2. The gas turbine engine of claim 1, wherein the supplementary coolant injector is exterior to the engine core.

3. The gas turbine engine of claim 1, wherein at least a second compressor bleed of the at least one compressor bleed is disposed at a mid-compressor stage.

4. The gas turbine engine of claim 1, wherein the supplementary coolant is configured to cool coolant in said first cooled cooling air path at least partially via expansion of the supplementary coolant.

5. The gas turbine engine of claim 1, wherein the supplementary coolant injector comprises a plurality of supplementary coolant ports, each supplementary coolant port in said plurality of supplementary coolant ports being configured to inject a portion of the supplementary coolant into the first cooled cooling air path.

6. The gas turbine engine of claim 1, wherein the at least one compressor bleed comprises at least the first compressor bleed connected to the first cooled cooling air path and a second compressor bleed connected to a second cooled cooling air path, and wherein the supplementary coolant connected to the first cooled cooling air path is a liquid, and a second supplementary coolant connected to the second cooled cooling air path is a compressed gas.

7. The gas turbine engine of claim 6, wherein the supplementary coolant is configured to cool coolant in said first cooled cooling air path at least partially via a state change of the supplementary coolant.

8. The gas turbine engine of claim 1, further comprising an engine controller controllably coupled to said supplementary coolant injector and configured to control injection of the supplementary coolant in the supplementary coolant supply through the supplementary coolant injector.

9. The gas turbine engine of claim 8, wherein the controller includes a memory storing instructions configured to cause the controller to operate the supplementary coolant injector at a first injection level during a first mode of engine operations, and at a second injection level during a second mode of engine operations.

10. The gas turbine engine of claim 1, wherein the first cooled cooling air path includes a heat exchanger configured to cool bleed air passing through the first cooled cooling air path.

11. The gas turbine engine of claim 1, wherein the supplementary coolant supply is distinct from the compressor.

12. The gas turbine engine of claim 1, wherein the supplementary coolant supply is a supplementary coolant reservoir.

13. The gas turbine engine of claim 1, wherein the supplementary coolant supply includes a first supplementary coolant reservoir and a second supplementary coolant reservoir distinct from the first supplementary coolant reservoir.

14. The gas turbine engine of claim 13, wherein a first coolant contained in the first supplementary coolant reservoir is a distinct coolant from a second coolant contained in the second supplementary coolant reservoir.

* * * * *